(12) United States Patent
Pulsipher et al.

(10) Patent No.: US 7,075,896 B1
(45) Date of Patent: Jul. 11, 2006

(54) METHOD FOR AUTOMATIC LAYOUT OF SWITCHED NETWORK TOPOLOGIES

(75) Inventors: Eric A. Pulsipher, Ft Collins, CO (US); Gautam Mehrotra, Fort Collins, CO (US); Mark A Schilling, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/526,830

(22) Filed: Mar. 16, 2000

(51) Int. Cl.
*H04L 12/28* (2006.01)

(52) U.S. Cl. .................................. 370/254; 370/389

(58) Field of Classification Search ........ 370/254–258, 370/354, 395, 430, 407, 413, 425, 452, 389, 370/419, 401, 406, 462, 392; 709/251–255, 709/220–225, 202; 710/8; 712/234
See application file for complete search history.

(56) References Cited

U.S. PATENT DOCUMENTS

| | | | | |
|---|---|---|---|---|
| 5,453,978 A | * | 9/1995 | Sethu et al. | 370/254 |
| 5,684,796 A | * | 11/1997 | Abidi et al. | 370/389 |
| 6,278,695 B1 | * | 8/2001 | Christensen et al. | 370/254 |
| 6,747,979 B1 | * | 6/2004 | Banks et al. | 370/401 |

\* cited by examiner

*Primary Examiner*—Chieh M. Fan
*Assistant Examiner*—Prenell Jones

(57) ABSTRACT

A method for the automatic layout of switched networks of switched network topologies. In representative embodiments, a topological map of a network is automatically obtained by combining various segments into one of three segment types, a bus segment, a serial segment, and a star segment. In the creation of the topological map of the network, the methods can be used to update the network map as changes occur.

14 Claims, 12 Drawing Sheets

METHOD FOR AUTOMATIC LAYOUT OF SWITCHED NETWORK TOPOLOGIES

FIELD OF THE INVENTION

The present invention relates generally to networks and, more particularly, to the management of networks, and, even more particularly, to the topological layout of switched networks.

BACKGROUND OF THE INVENTION

As communications networks, such as the Internet, carry more and more traffic, efficient use of the bandwidth available in the network becomes more and more important. Switching technology was developed in order to reduce congestion and associated competition for the available bandwidth. Switching technology works by restricting traffic. Instead of broadcasting a given data packet to all parts of the network, switches are used to control data flow such that the data packet is sent only along those network segments necessary to deliver it to the target node. The smaller volume of traffic on any given segment results in fewer packet collisions on that segment, and thus the smoother and faster delivery of data. A choice between alternative paths is usually possible and is typically made based upon current traffic patterns.

The intelligent routing of data packets with resultant reduction in network congestion can only be effected if the network topology is known. The topology of a network is a description of the network which includes the location of and interconnections between nodes on the network. The word "topology" refers to either the physical or logical layout of the network, including devices, and their connections in relationship to one another. Information necessary to create the topology layout can be derived from tables stored in network devices such as hubs, bridges, and switches. The information in these tables is in a constant state of flux as new entries are being added and old entries time out. Many times there simply is not enough information to determine where to place a particular device.

Switches examine each data packet which they receive, read their source addresses, and log those addresses into tables along with the switch ports on which the packets were received. If a packet is received with an unknown target address, the switch receiving it broadcasts that packet to each of its ports. When the switch receives a reply, it will have identified where the new node lies.

In a large network with multiple possible paths from the switch to the target node, this table can become quite large and may require a significant amount of the switch's resources to develop and maintain. As an additional complication, the physical layout of devices and their connections are typically in a state of constant change. Devices are continually being removed from, added to, and moved to new physical locations on the network. To be effectively managed, the topology of a network must be accurately and efficiently ascertained, as well as maintained.

In a switch, each port of the switch forms a so called "collision domain." Existing techniques for ascertaining the topology of a network involve creating a so called "container" or "segment" for each collision domain. Thus, the topological map of the network ends up with one container or segment per port for each switch.

Current methods for creating topological maps in networks containing switches can cause a proliferation of segments. Although such proliferation of segments may be correct under the product's layout models, it causes the network level sub-map to be cluttered and often unusable. As an example, a port on a switch connected to a node would create a new segment on the topological map, as would the attachment of a port on a switch to a port on another switch. For a network comprising a large number of switches and nodes the number of segments and associated table entries can quickly become very large and unwieldy resulting in the heavy use of computer resources in creating and maintaining network topological data. Thus, there exists a need for a method of creating a topological map of a network which is accurate, frugal in its utilization of network resources, and which can easily be used to update the network map as changes occur.

SUMMARY OF THE INVENTION

The present patent document relates to a novel method for intelligently and automatically laying out the topologies of switched networks. Previous methods for laying out the topologies of switched networks have relied upon creating a segment for each and every switch port connected to a node and upon creating a segment for each port of a switch that is connected to a port of another switch.

As used herein, a node is any electronic device or combination of electronic devices with their interconnections. In the representative embodiments disclosed, the nodes could be for example combinations of interconnected electronic devices, such as but not limited to other networks and sub-networks. Also, the nodes could be terminals, workstations, personal computers, printers, scanners, or any other electronic device which can be connected to networks.

Also as used herein, a switching device is any device that controls the flow of messages on a network. Switching devices include, but are not limited to, any of the following devices: repeaters, hubs, routers, bridges, and switches.

In representative embodiments, bus segments are disclosed wherein a bus segment comprises two or more nodes connected to a port of a switching device, serial segments are disclosed wherein a serial segment comprises a port on one switching device connected to a port on another switching device, and star segments are disclosed wherein a star segment comprises all ports with attached nodes on a switching device that have only one node connected to each port.

A primary advantage of the embodiment as described in the present patent document over prior techniques is the reduction in the number of segments created in topological maps of the network with a resultant simplification of the topology maps for networks. It is recognized that the topological mapping referred to herein may be contained in one or more tables, and it is not necessarily required for the mapping system to create the map as a drawing. The simplifications provided in the representative embodiments of the present application provide further advantage in reducing the consumption of valuable system resources.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings provide visual representations which will be used to more fully describe the invention and can be used by those skilled in the art to better understand it and its inherent advantages. In these drawings, like reference numerals identify corresponding elements and.

DETAILED DESCRIPTION OF THE PREFERRED EMBODIMENTS

Figure 1:
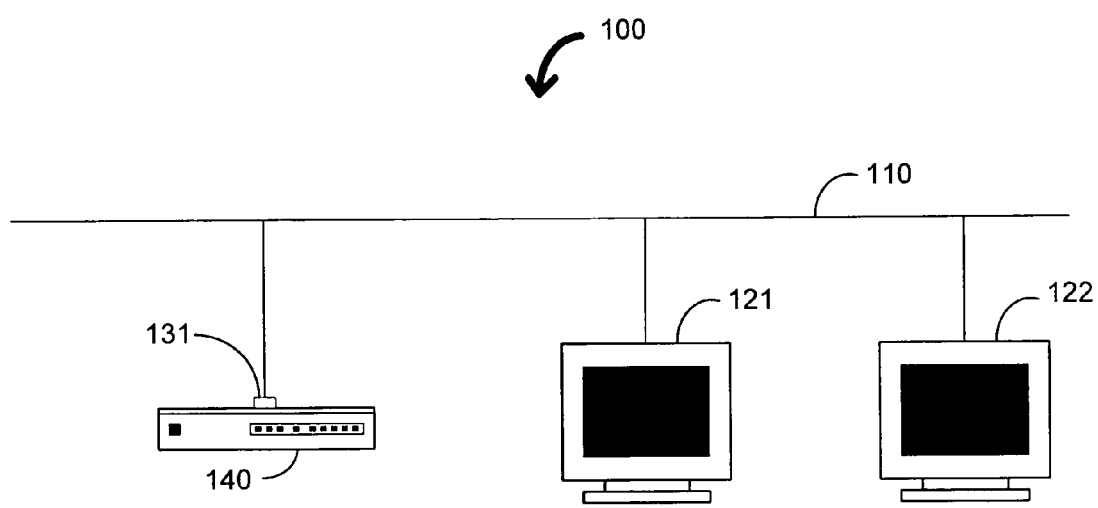
FIG. 1 is a drawing of a typical topological bus segment for representing the connectivity of nodes on a network as described in various representative embodiments of the present patent document.

As shown in the drawings for purposes of illustration, the present patent document relates to a novel method for intelligently and automatically laying out the topologies of switched networks. Previous methods for laying out the topologies of switched networks have relied upon creating a segment for each and every switch port connected to a node and upon creating a segment for each port of a switch that is connected to a port of another switch. In the following detailed description and in the several figures of the drawings, like elements are identified with like reference numerals.

1. Definitions:

As used herein, a node is any electronic device or combination of electronic devices with their interconnections.

A switching device is any device that controls the flow of messages on a network. Switching devices include, but are not limited to, any of the following devices: repeaters, hubs, routers, bridges, and switches.

FIG. 1 is a drawing of a typical topological bus segment 100 for representing the connectivity of nodes on a network 110 as described in various representative embodiments of the present patent document. In FIG. 1, a first and second nodes 121,122, as well as a first port 131 of a first switching device 140 are interconnected via the network 110. The bus segment 100 comprises the first and second nodes 121,122 connected to the first port 131 of the first switching device 140. Nodes heard on a common port of a switch are placed into a bus segment.

Figure 2:
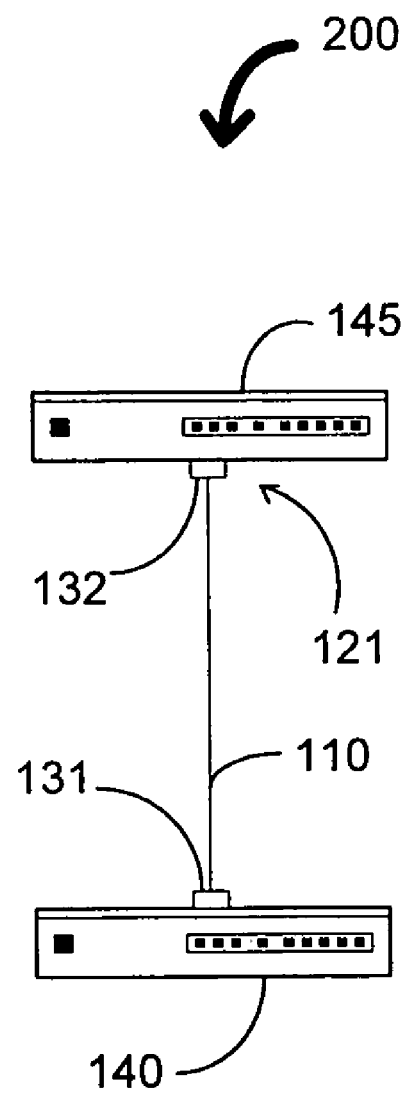
FIG. 2 is a drawing of a typical topological serial segment for representing the connectivity of nodes on the network as described in various representative embodiments of the present patent document.

FIG. 2 is a drawing of a typical topological serial segment 200 for representing the connectivity of nodes on the network 110 as described in various representative embodiments of the present patent document. In FIG. 2, the first node 121 comprises a second port 132 on a second switching device 145 which is connected via the network 110 to the first port 131 on the first switching device 140. The serial segment 200 comprises the second port 132 on the second switching device 145 connected to the first port 131 on the first switching device 140.

Figure 3:
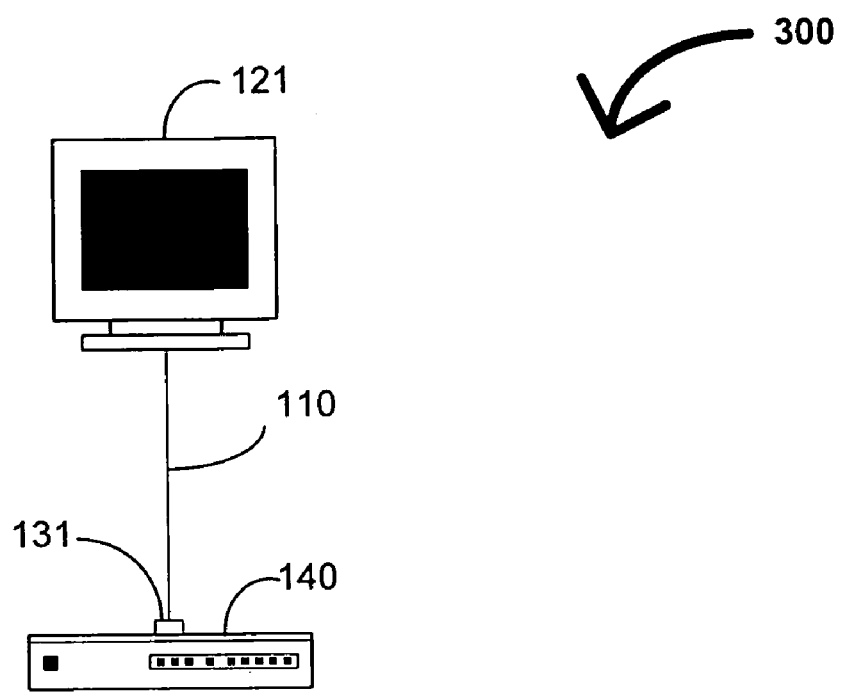
FIG. 3 is a drawing of a typical topological star segment for representing the connectivity of nodes on the network as described in various representative embodiments of the present patent document.

FIG. 3 is a drawing of a typical topological star segment 300 for representing the connectivity of nodes on the network 110 as described in various representative embodiments of the present patent document. In FIG. 3, the first node 121 is connected to the first port 131 of the first switching device 140. The star segment 300 comprises the first node 121 connected to the first port 131 of the first switching device 140.

Figure 4:
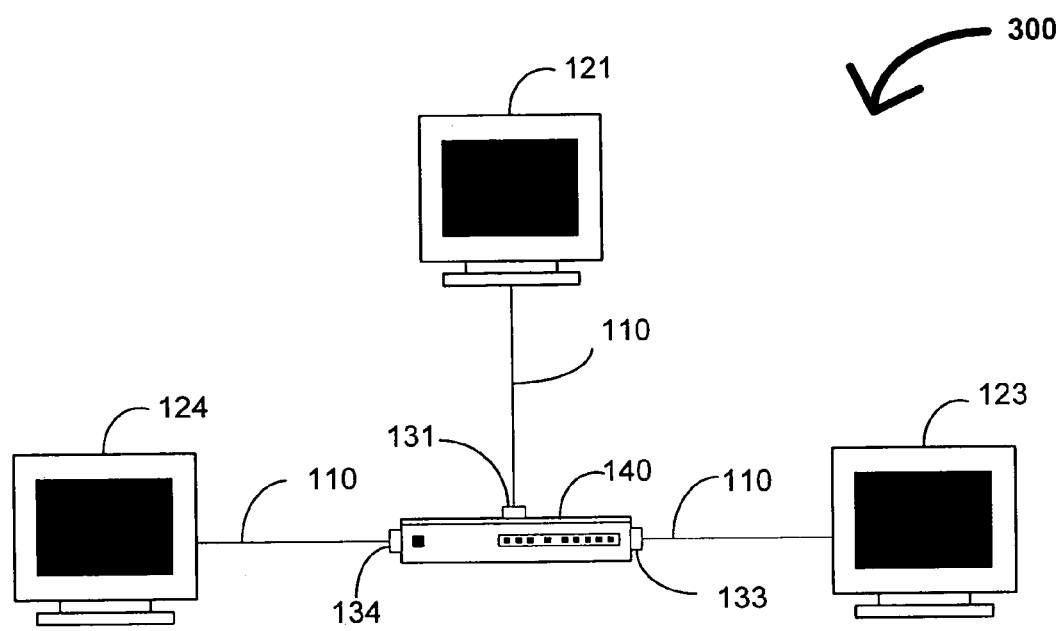
FIG. 4 is a drawing of another typical topological star segment for representing the connectivity of nodes on the network as described in various representative embodiments of the present patent document.

FIG. 4 is a drawing of another typical topological star segment 300 for representing the connectivity of nodes on the network 110 as described in various representative embodiments of the present patent document. In addition to the connections described with respect to FIG. 3, a third node 123 is connected to a third port 133 of the first switching device 140 and a fourth node 124 is connected to a fourth port 134 of the first switching device 140. In FIG. 4, the star segment 300 comprises the first node 121 connected to the first port 131 of the first switching device 140, the third node 123 connected to the third port 133 of the first switching device 140, and the fourth node 124 connected to the fourth port 134 of the first switching device 140. Thus, the star segment 300 comprises, on a given switching device, at least one port, wherein one and only one node is connected to that port, and that node. In the more general case, the star segment 300 comprises, on a given switching device, all ports having one and only one node connected to each port, and those connected nodes. Since the segments drawn using the topological methods of FIG. 4 resemble a star, they are referred to as star segments.

For illustrative purposes, nodes in the figures described above and in subsequent figures are shown as individual electronic devices or ports on switching devices. However, in other representative embodiments the nodes could be, for example, combinations of interconnected electronic devices, such as but not limited to other networks and sub-networks. Also, in the figures the nodes are represented as terminals. However, they could also be workstations, personal computers, printers, scanners, or any other electronic device which can be connected to networks 110.

2. Example Network Connectivity

Figure 5:
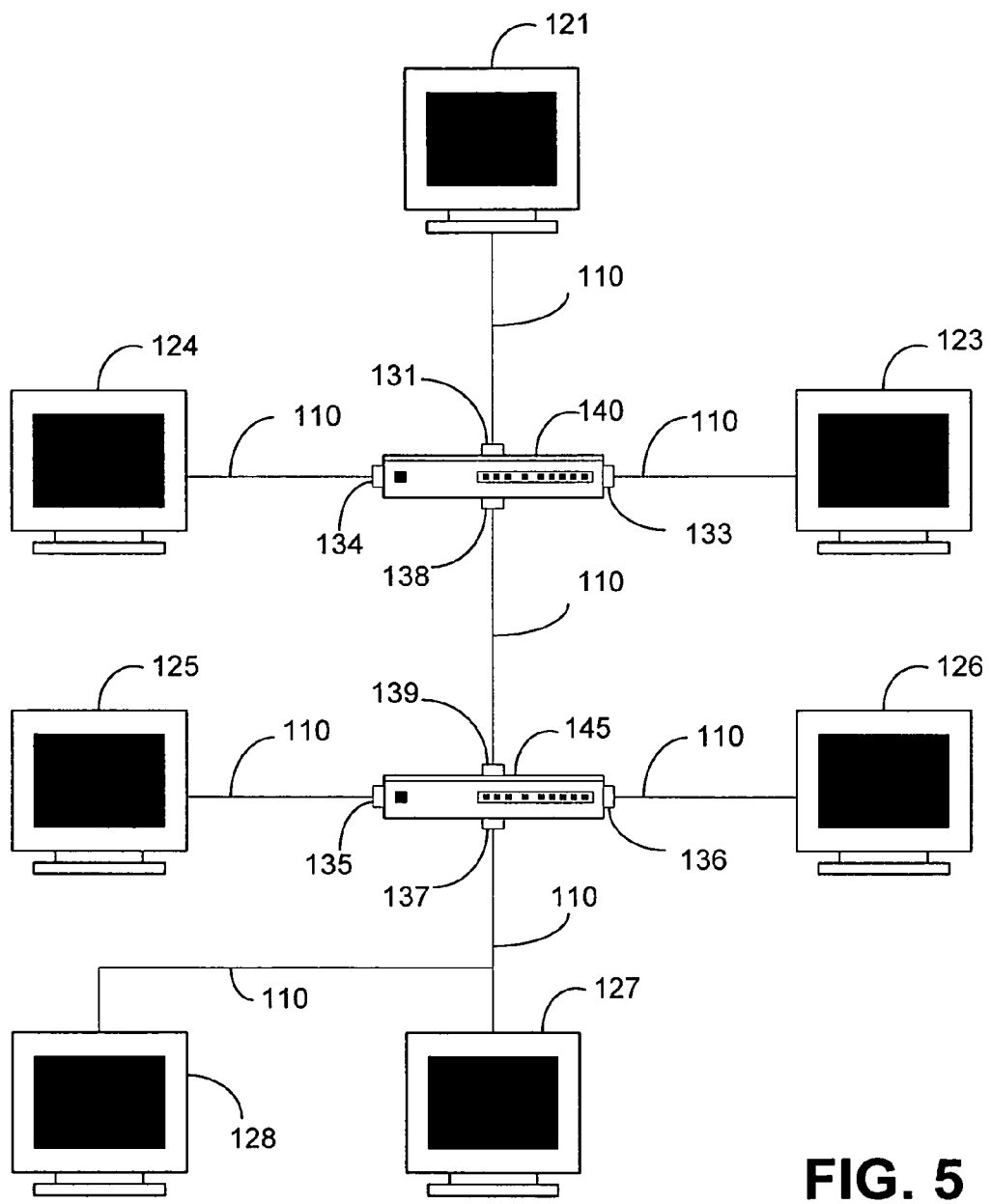
FIG. 5 is a drawing of the connectivity of an example network system.

FIG. 5 is a drawing of the connectivity of an example network system. In FIG. 5, first, third, and fourth nodes 121,123,124 are connected via the network 110 to first, third, and fourth ports 131,133,134 respectively, wherein the first, third, and fourth ports 131,133,134 are located on the first switching device 140. Also in FIG. 5, fifth, sixth, and seventh nodes 125,126,127 are connected via the network 110 to fifth, sixth, and seventh ports 135,136,137 respectively and an eight node 128 is connected via the network 110 to the seventh port 137, wherein the fifth, sixth, and seventh ports 135,136,137 are located on the second switching device 145. The first switching device 140 is connected to the second switching device 145 via an eight port 138 located on the first switching device 140 and via a ninth port 139 located on the second switching device 145 with the eight port 138 and the ninth port 139 also being connected to the network 110.

Figure 6:
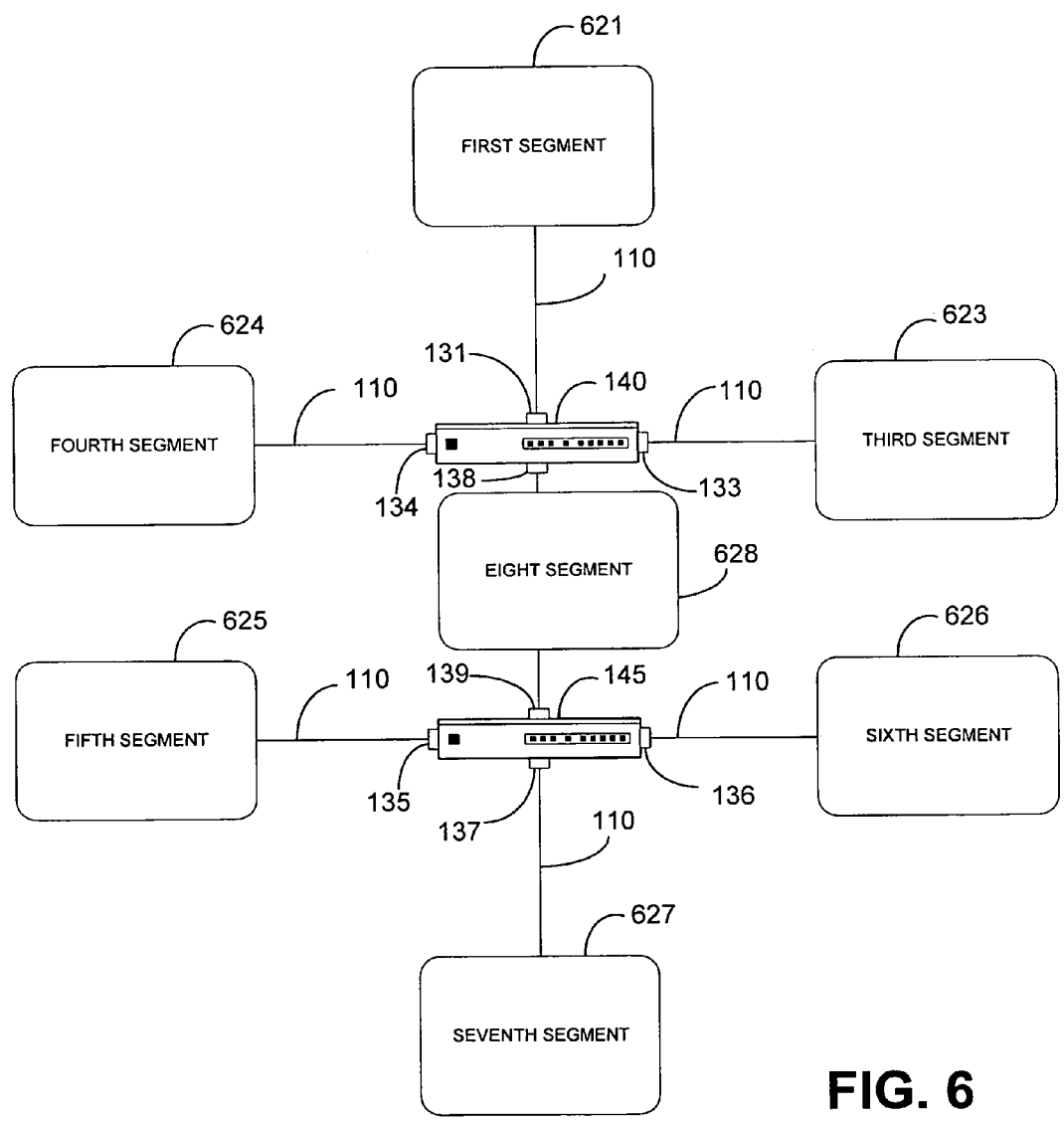
FIG. 6 is a drawing of the connectivity of the example network system of FIG. 5 illustrating the location of typical segments.

FIG. 6 is a drawing of the connectivity of the example network system of FIG. 5 illustrating the location of typical segments. This figure illustrates the proliferation of segments which can occur when segments are indiscriminately assigned. In FIG. 6, a first, third, and fourth segments 621,623,624 represent respectively the connectivity of the first, third, and fourth nodes 121,123,124 via the network 110 with the first, third, and fourth ports 131,133,134 on the first switching device 140. Fifth and sixth segments 625,626 represent respectively the connectivity of the fifth and sixth nodes 125,126 via the network 110 with the fifth and sixth ports 135,136 on the second switching device 145. In addition, a seventh segment 627 represents the connectivity of seventh and eighth nodes 127,128 via the network 110 with the seventh port 137 on the second switching device 145. An eighth segment 628 represents the connectivity of the eighth port 138 on the first switching device 140 via the network 110 with the ninth port 139 on the second switching device 145. Creating topological maps of the network 110 as shown in FIG. 6 results in a topological segment for every node/switch port pair on the network 110. In complex networks the proliferation of segments which will change as nodes are added to and removed from the network rapidly becomes unmanageable. Thus, there exists a need for a method of creating a topological map of a network which is accurate, frugal in its utilization of network resources, and which can easily be used to update the network map as changes occur. Considerable simplification in the topological map of FIG. 6 can be obtained by replacing the numerous segments in FIG. 6 with bus, serial, and star segments similar to those of FIGS. 1–4.

Figure 7:
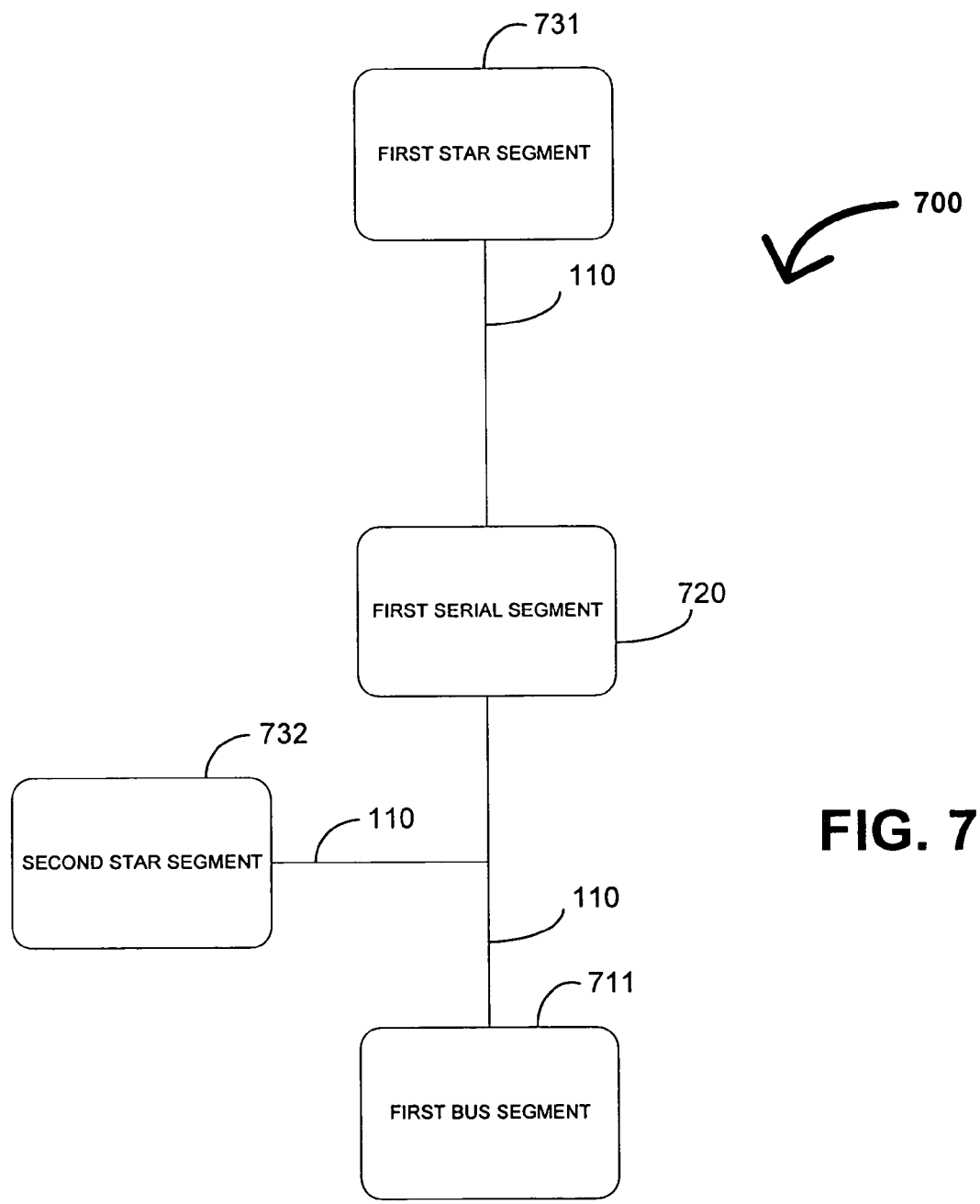
FIG. 7 is a drawing of a reduced segment topological map of the example network system of FIG. 5 as described in various representative embodiments of the present patent document.

FIG. 7 is a drawing of a reduced segment topological map 700 of the example network system of FIG. 5 as described in various representative embodiments of the present patent document. In FIG. 7, first, third, and fourth segments 621, 623,624 of FIG. 6 are replaced by a first star segment 731; the eighth segment 628 of FIG. 6 is replaced by a first serial segment 721; fifth and sixth segments 625,626 of FIG. 6 are replaced by a second star segment 732; and seventh segment 627 of FIG. 6 is replaced by a first bus segment 711. The bus, serial, and star segments of FIG. 7 are similar to those of FIGS. 1–4. Once again note the simplification that is obtained. The seven segments of FIG. 6 have been reduced to four in FIG. 7. For purposes of clarity in representative embodiments, the various segments of FIG. 7 would typically be shown interconnected via ports on switches even though the ports on those switches are parts of the segments themselves.

Figure 8:
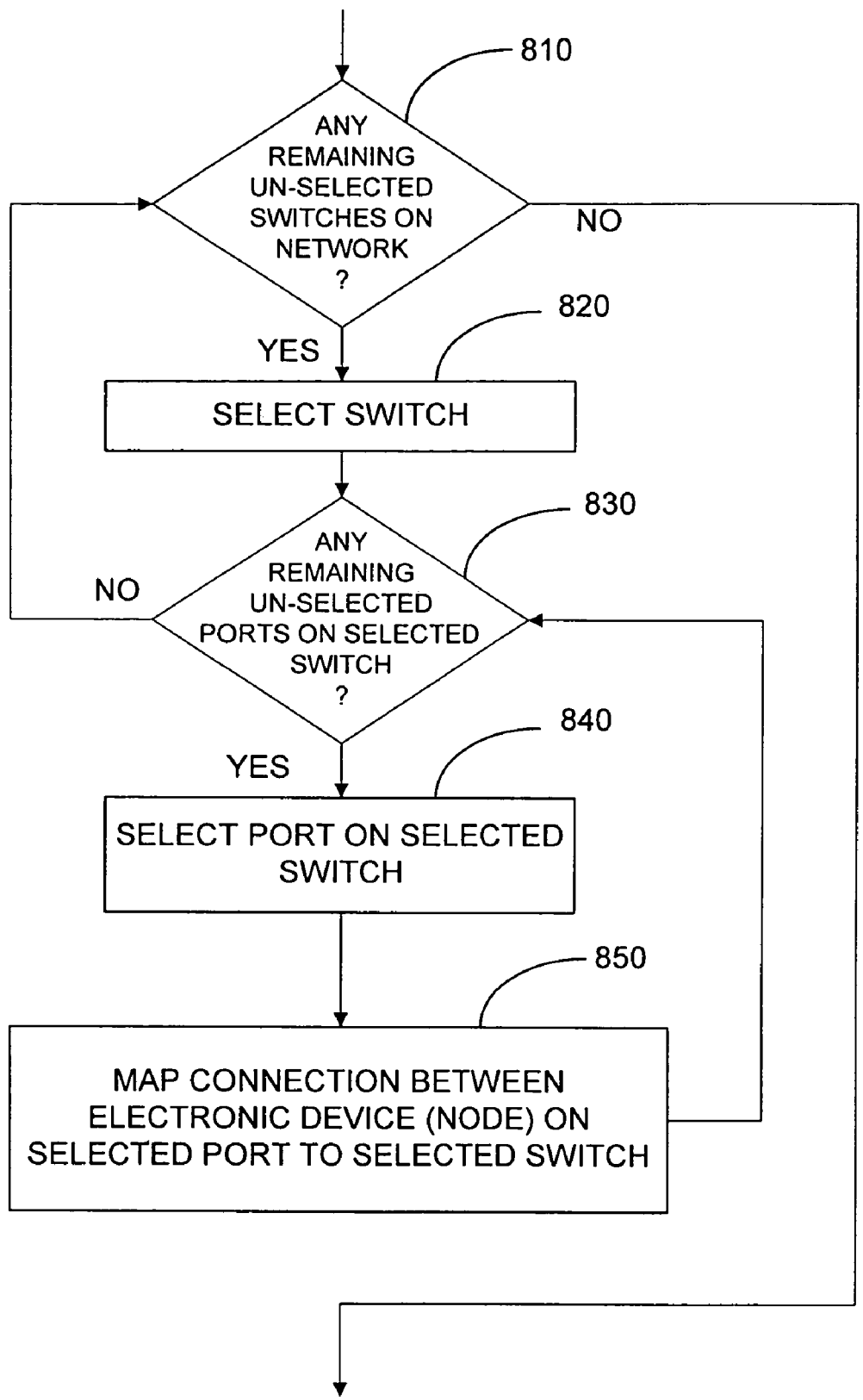
FIG. 8 is a flow chart of the method steps performed in creating reduced segment topological maps as described in various representative embodiments of the present patent document.

FIG. 8 is a flow chart of the method steps performed in creating reduced segment topological maps 700 as described in various representative embodiments of the present patent document.

When there are remaining un-selected switching devices on the network 110, block 810 transfers control to block 820. Otherwise, block 810 terminates the process.

Block 820 selects a previously un-selected switching device and then transfers control to block 830.

When there are remaining un-selected ports on the selected switching device, block 830 transfers control to block 840. Otherwise, block 830 transfers control to block 810.

Block 840 selects a previously un-selected port on the selected switching device and then transfers control to block 850.

Block 850 maps the connection of the electronic device, i.e. the node, connected to the selected port on the selected switching device. Block 850 then transfers control to block 830.

In summary, in representative embodiments reduced segment topological maps 700 are created by combining all switching devices connected to the network with all nodes that are connected to the ports of each switching device. The methods presented may be implemented in a computer program readable by a computer. The computer may be connected to the network.

Figure 9A:
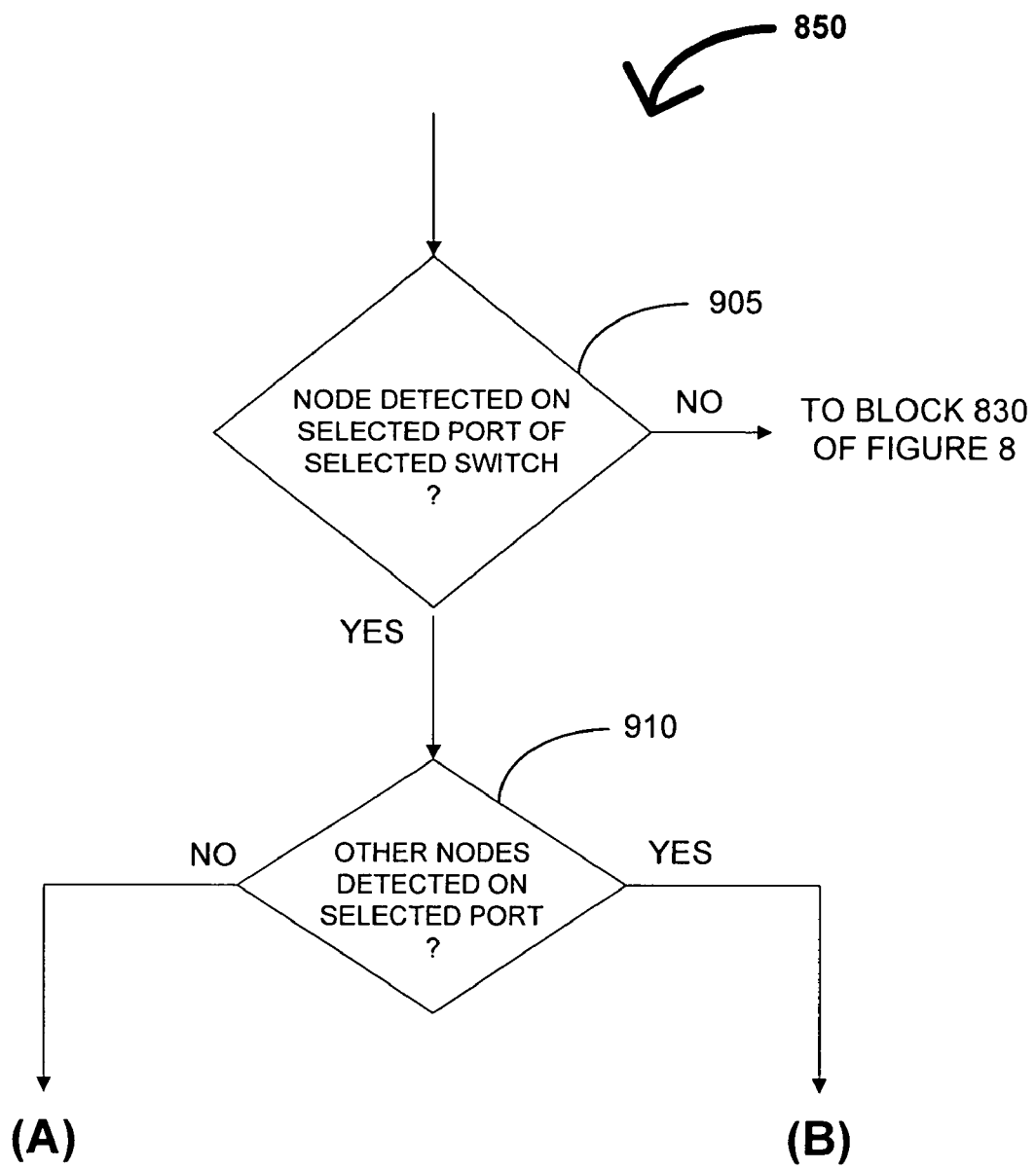
FIG. 9A is a flow chart of a portion of the method steps of FIG. 8 performed in creating the reduced segment topological map as described in various representative embodiments of the present patent document.

FIG. 9A is flow chart of a portion of the method steps of FIG. 8 performed in creating the reduced segment topological map 700 as described in various representative embodiments of the present patent document. In particular, FIG. 9A, with related FIGS. 9B and 9C, form an expansion of Block 850 of FIG. 8. When node has been detected by switching device 140,145 on the network 110, block 905 transfers control to block 910. Otherwise, block 905 transfers control to block 830 of FIG. 8.

When other nodes have been detected on the same port by the switching device 140 block 910 transfers control to block 950, otherwise block 910 transfers control to block 915. Block 915 is shown on FIG. 9B, and block 950 is shown in FIG. 9C. The connection between blocks 910 and 915 is shown as (A) in FIGS. 9A and 9B, and the connection between blocks 910 and 950 is shown as (B) in FIGS. 9A and 9C.

Figure 9B:
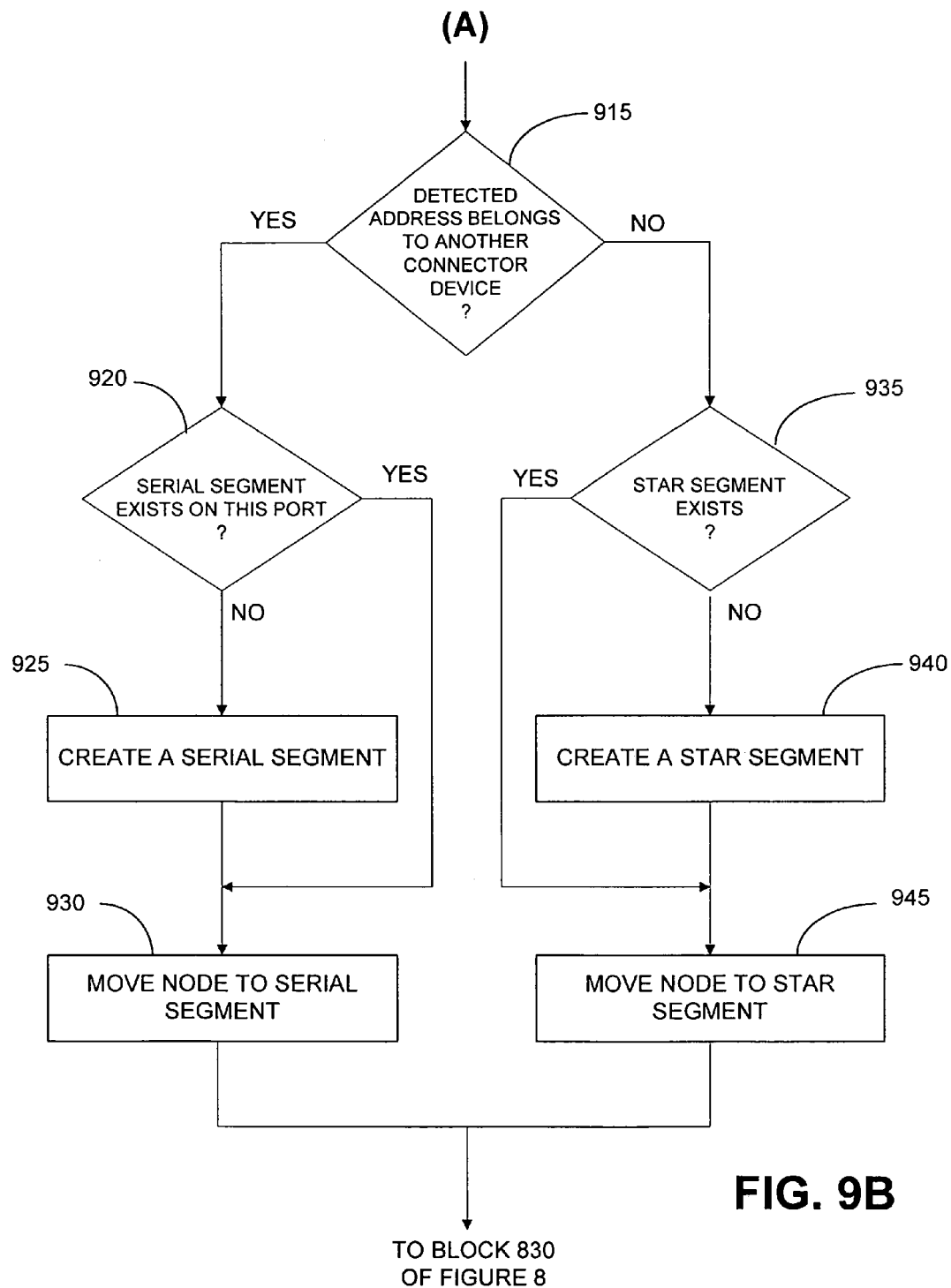
FIG. 9B is a flow chart of a continuation of a part of the flow chart of FIG. 9A as described in various representative embodiments of the present patent document.
Figure 9C:
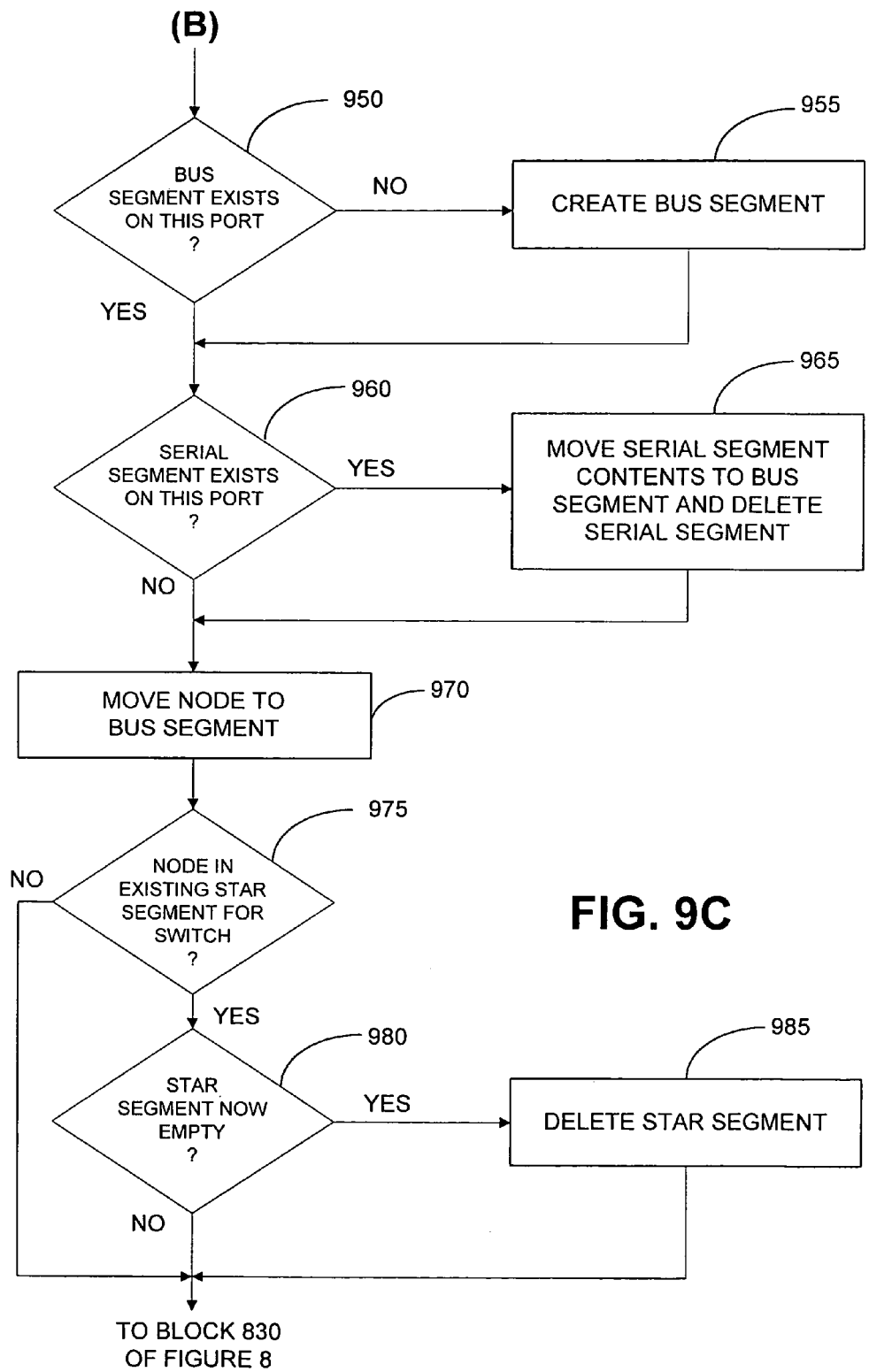
FIG. 9C is a flow chart of a continuation of another part of the flow chart of FIG. 9A as described in various representative embodiments of the present patent document.

FIG. 9B is a flow chart of a continuation of a part of the flow chart of FIG. 9A as described in various representative embodiments of the present patent document. When the detected address belongs to another connector device block 915 transfers control to block 920, otherwise block 915 transfers control to block 935.

When serial segment 200 exists on this port of the switching device 140,145, block 920 transfers control to block 930, otherwise block 920 transfers control to block 925.

Block 925 creates serial segment 200 and then transfers control to block 930.

Block 930 moves the node to the serial segment 200. Block 930 then transfers control to block 830 of FIG. 8.

When a star segment exist on this port of the connector device, block 935 transfers control to block 945, otherwise block 935 transfers control to block 940.

Block 940 creates star segment 300 and then transfers control to block 945.

Block 945 moves the node to the star segment 300. Block 945 then transfers control to block 830 of FIG. 8.

FIG. 9C is a flow chart of a continuation of another part of the flow chart of FIG. 9A as described in various representative embodiments of the present patent document. When bus segment 100 exists on this port of the switching device 140,145, block 950 transfers control to block 960, otherwise block 950 transfers control to block 955.

Block 955 creates bus segment 100. Block 955 then transfers control to block 960.

When serial segment 200 exists on this port of the connector device, block 960 transfers control to block 965, otherwise block 960 transfers control to block 970.

Block 965 moves the contents of the serial segment 200 to the bus segment 100 and deletes the serial segment 200. Block 965 then transfers control to block 970.

Block 970 moves the detected node to the bus segment 100. Block 970 then transfers control to block 975.

When the detected node is in existing star segment 300 for the switching device 140,145, block 975 transfers control to block 980, otherwise block 975 transfers control to block 830 of FIG. 8.

When the star segment 300 is empty, block 980 transfers control to block 985, otherwise block 980 transfers control to block 830 of FIG. 8.

Block 985 deletes the star segment 300. Block 985 then transfers control to block 830 of FIG. 8.

Figure 10:
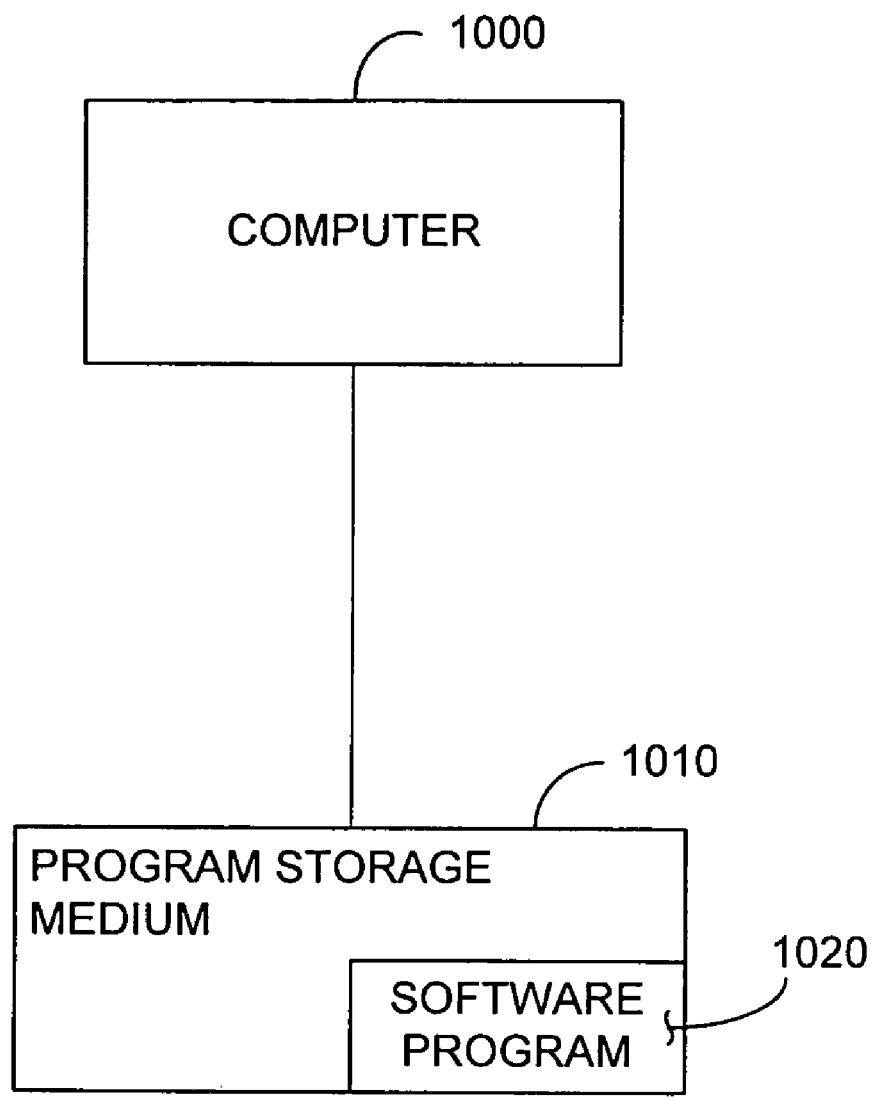
FIG. 10 is a drawing of a computer used for creating and managing reduced segment topological maps for representing the connectivity of nodes on the network as described in various representative embodiments of the present patent document.

FIG. 10 is a drawing of a computer 1000 used for creating and managing reduced segment topological maps 700 for representing the connectivity of nodes 121–127 on the network 110 as described in various representative embodiments of the present patent document. In FIG. 10, a software program 1020 comprising the method steps of FIGS. 8, 9A, 9B, and 9C is stored on a program storage medium 1010 which could be, for example, a floppy disk, a CD ROM, a hard disk, RAM, or ROM. The memory represented by the program storage medium 1010 could be the main memory of the computer, a cache, or could be maintained remotely. The computer 1000 runs the software program 1020 in order to create and manage the reduced segment topological maps 700.

3. Concluding Remarks

A primary advantage of the embodiment as described in the present patent document over prior techniques is the reduction in the number of segments created in topological maps of the network. The technique of FIG. 6 creates a total of seven segments for the network of FIG. 5, while representative embodiments of the present invention create four segments for the same network as shown in FIG. 7. There is a resultant simplification of the topology of the example network. It is recognized that the topological mapping referred to herein may be contained in one or more tables, and it is not necessarily required for the mapping system to create the map as a drawing. The simplifications provided in the representative embodiments of the present application provide further advantage in reducing the consumption of valuable system resources.

While the present invention has been described in detail in relation to preferred embodiments thereof, the described embodiments have been presented by way of example and not by way of limitation. It will be understood by those skilled in the art that various changes may be made in the form and details of the described embodiments resulting in equivalent embodiments that remain within the scope of the appended claims.

What is claimed is:

1. A program storage medium readable by a computer, embodying a computer program of instructions executable by the computer for automatically specifying a topological map, wherein the topological map describes the connectivity of nodes on a computer network, wherein the network comprises a first switching device having a first port, the instructions are executed by the computer to perform the method steps comprising:

detecting connection of a first node to the first port;

if connection of a second node to the first port was previously detected:
  specifying that the topological map of the network comprises a bus segment attached to the first port, wherein the bus segment comprises the first port, the first node, the second node, and that part of the network interconnecting the first port, the first node, and the second node, otherwise, if the first node is a second port located on a second switching device:
  specifying that the topological map of the network comprises a serial segment attached to the first port, wherein the serial segment comprises the first port, the second port, and that part of the network interconnecting the first port and the second port, and otherwise:
  specifying that the topological map of the network comprises a star segment attached to the first port, wherein the star segment comprises the first port, the first node, and that part of the network interconnecting the first port and the first node; and using the topological map to control the flow of messages on the network.

2. The program storage medium as recited in claim 1, wherein the method step specifying that the topological map of the network comprises the bus segment attached to the first port comprises:

if the bus segment is absent, specifying the bus segment;

if the serial segment was previously specified:
  transferring the second node and the first port from the previously specified serial segment to the bus segment,
  deleting the previously specified serial segment, and
  adding the first node to the bus segment;

otherwise, if the star segment was previously specified:
  transferring the second node from the previously specified star segment to the bus segment,
  deleting the previously specified star segment, and
  adding the first node to the bus segment; and otherwise, adding the first node to the bus segment.

3. The program storage medium as recited in claim 1, wherein the method step specifying that the topological map of the network comprises the serial segment attached to the first port comprises:

specifying the serial segment;

adding the first node to the serial segment; and adding the first port to the serial segment.

4. The program storage medium as recited in claim 1, wherein the method step specifying that the topological map of the network comprises the star segment attached to the first port comprises:

specifying the star segment;

adding the first node to the star segment; and adding the first port to the star segment.

5. The program storage medium as recited in claim 1, wherein first and second nodes are electronic devices.

6. The program storage medium as recited in claim 1, wherein first and second switching devices are electronic devices selected from the group consisting of repeaters, hubs, routers, bridges, and switches.

7. The program storage medium as recited in claim 1, wherein the star segment further comprises a third node connected to a third port located on the first switching device.

8. A computer operable method for automatically creating a topological map, wherein the topological map describes the connectivity of nodes on a computer network, wherein the network comprises a first switching device having a first port, comprising:

detecting connection of a first node to the first port;

if connection of a second node to the first port was previously detected:

specifying that the topological map of the network comprises a bus segment attached to the first port, wherein the bus segment comprises the first port, the first node, the second node, and that part of the network interconnecting the first port, the first node, and the second node, otherwise, if the first node is a second port located on a second switching device:

specifying that the topological map of the network comprises a serial segment attached to the first port, wherein the serial segment comprises the first port, the second port, and that part of the network interconnecting the first port and the second port, and otherwise:

specifying that the topological map of the network comprises a star segment attached to the first port, wherein the star segment comprises the first port, the first node, and that part of the network interconnecting the first port and the first node; and using the topological map to control the flow of messages on the network.

9. The computer operable method as recited in claim 8, the method step specifying that the topological map of the computer network comprises the bus segment attached to the first port comprising:

if the bus segment is absent, specifying the bus segment;

if the serial segment was previously specified:

transferring the second node and the first port from the previously specified serial segment to the bus segment, deleting the previously specified serial segment, and adding the first node to the bus segment;

otherwise, if the star segment was previously specified:

transferring the second node from the previously specified star segment to the bus segment, deleting the previously specified star segment, and adding the first node to the bus segment; and otherwise, adding the first node to the bus segment.

10. The computer operable method as recited in claim 8, wherein the method step specifying that the topological map of the network comprises the serial segment attached to the fort port comprises:

specifying the serial segment;

adding the first node to the serial segment; and adding the first port to the serial segment.

11. The computer operable method as recited in claim 8, wherein the method step specifying that the topological map of the network comprises the star segment attached to the first port comprises:

specifying the star segment;

adding the first node to the star segment; and adding the first port to the star segment.

12. The computer operable method as recited in claim 8, providing first and second nodes are electronic devices.

13. The computer operable method as recited in claim 8, providing first and second switching devices are electronic devices selected from the group consisting of repeaters, hubs, routers, bridges, and switches.

14. The computer operable method as recited in claim 8, providing the star segment further comprises a third node connected to a third port located on the first switching device.

* * * * *